United States Patent [19]

Ham et al.

[11] Patent Number: 4,476,292

[45] Date of Patent: Oct. 9, 1984

[54] CASTABLE POLYURETHANE SYSTEMS

[75] Inventors: Nancy M. Ham, Williamston; Teruko Miyazaki, Okemos, both of Mich.

[73] Assignee: Ciba-Geigy Corporation, Ardsley, N.Y.

[21] Appl. No.: 574,823

[22] Filed: Jan. 30, 1984

[51] Int. Cl.³ .............................................. C08G 18/10
[52] U.S. Cl. ........................................ 528/60; 528/65
[58] Field of Search .................................... 528/60, 65

[56] References Cited

U.S. PATENT DOCUMENTS 3,781,238 12/1973 Helm ...................................... 528/60
4,028,301 6/1977 Olstowski .............................. 528/61
4,045,527 8/1977 Babayon et al. ....................... 528/60
4,387,194 6/1983 Ottoviani et al. ...................... 528/49

Primary Examiner—Maurice J. Welsh
Attorney, Agent, or Firm—Harry Falber

[57] ABSTRACT

A castable polyurethane system comprising the reaction product of (1) a polyisocyanate prepolymer prepared by reacting an excess of a polyisocyanate compound with an amine-based polyol and (2) a polyol, said polyurethane systems being clear, hard, easily cast, impact resistant, heat resistant and appropriate for a number of applicable uses.

14 Claims, No Drawings

CASTABLE POLYURETHANE SYSTEMS

The chemistry of combining polyisocyanates and polyols to form prepolymers and the chemistry of curing the prepolymer with active hydrogen containing compounds are well known. The resulting polyurethane systems have been used for a variety of applications such as casting resins, coatings, encapsulants and for general polyurethane elastomeric uses. Unfortunately, pre-existing systems have not exhibited optimum properties for certain of these uses, particularly for casting purposes and the preparation of clear prototype products. These required properties include clarity, minimum color, heat resistance, minimum shrinkage, hardness, impact resistance and low viscosity to facilitate mixing and pouring of the system. It is to be noted that existing, easily cast urethanes (e.g. non-prepolymer, two-component, plasticized systems) have not exhibited the required clarity, absence of color and stability to be effectively utilized for clear casting purposes.

In an effort to minimize these difficulties, resort has been had to various acrylic (e.g. LUCITE from DuPont) and epoxy systems. Although acrylics provide the desired clarity, they generally are available only in sheet form and must be machined to various shapes, thereby making it rather difficult to fabricate to specific and more intricate shapes. Such acrylic products also exhibit high shrinkage. Correspondingly, epoxy systems are brittle and lose their clarity with the passage of time.

It is therefore the primary object of this invention to provide clear, castable polyurethane systems which are applicable for a broad range of utilities.

It is another object to provide such systems which eliminate or substantially reduce the disadvantages encountered with prior art systems.

Various other objects and advantages of this invention will be readily apparent from the following detailed description thereof.

It has now been surprisingly discovered that by combining specific polyisocyanate prepolymers and polyols, polyurethane systems are obtained which are well suited for a number of end use applications, particularly for casting and prototype fabrication operations. Thus, the reaction of a prepolymer prepared from aliphatic or cycloaliphatic polyisocyanates and an amine-based polyol and a polyol system of amine-based polyols, polyether polyols and mixtures thereof provides polyurethane systems exhibiting excellent properties. These systems thus exhibit clarity, heat resistance, low shrinkage, high hardness, impact resistance and sufficiently high heat deflection temperatures. They exhibit relatively low mixed viscosities which facilitate their ease of mixing and pouring. The systems are also readily compatible with a variety of optional additives such, for example, as light stabilizers which allows for prolonged light stability without evidence of color formation and/or degradation.

The polyurethane of the present invention is prepared by reacting approximately stoichiometric amounts of a polyisocyanate with a polyol. The polyisocyanate is a polyisocyanate prepolymer which is in turn prepared by reacting an excess of a polyisocyanate compound with a amine-based polyol in a manner well known in the art. For purposes of this invention, the term "prepolymer" is intended to reflect the products of the latter reaction. The polyisocyanate prepolymer is then reacted with the polyol in the presence of optional additives to form the polyurethane system.

The polyisocyanate compound which is used in the preparation of the polyisocyanate prepolymer is a liquid aliphatic or cycloaliphatic polyisocyanate. Typical of such polyisocyanate compounds are 3-isocyanatomethyl 3,5,5-trimethylcyclohexyl isocyanate (isophorone diisocyanate), 4,4'-methylene bis-(cyclohexylisocyanate), hexamethylene diisocyanate, biuret of hexamethylene diisocyanate, 1,3-cyclohexane bis(methylisocyanate), 2,2,4-trimethylhexamethylene diisocyanate and combinations thereof, as well as related aliphatic and cycloaliphatic polyisocyanates which may be substituted with other organic or inorganic groups tht do not adversely affect the course of the reaction. The 4,4'-methylene bis(cyclohexylisocyanate), hexamethylene diisocyanate and isophorone diisocyanate are preferred.

The term "aliphatic", as used herein, includes those carbon chains which are substantially non-aromatic in nature. They may be saturated or unsaturated, unbranched, branched or cyclic in configuration and may contain various substituents. Such aliphatic isocyanates generally have an equivalent weight of from 60 to 160 and a viscosity of 1.0 to 1500.0 centipoises at 25° C. Exemplary of the liquid long chain aliphatic polyisocyanates are dodecyl diisocyanate, tridecyl diisocyanate, and the like.

Isocyanate terminated prepolymers are available from REN Plastics such as RP-6414 based on DESMODUR W (Mobay), a cycloaliphatic isocyanate.

The amine-based polyols which are reacted with the polyisocyanate prepolymer generally have an equivalent weight of from 30 to 6000 and a viscosity of from 1.0 to 20,000 centiposises at 25° C.-60° C. A wide variety of aromatic and aliphatic diamines may form part of the amine-based polyols, such polyols including N,N,N',N'-tetrakis(2-hydroxypropyl)ethylene-diamine and a polymer of ethylene diamine, propylene oxide and ethylene oxide. A typical aromatic amine-based polyol is available from Upjohn under the designation ISONOL 100, a typical aliphatic amine-based polyol is available from BASF under the designation QUADROL and a typical ethylene diamine/propylene oxide/ethylene oxide polymer is available from BASF under the designation PLURACOL 355.

Preferred concentration ranges for the respective components of the prepolymer are 85-95% by weight of polyisocyanate and 5-15% by weight polyol to form a resin prepolymer of 20-55% by weight polymer dissolved in 45-80% by weight excess isocyanate, and preferably 30 to 40%, by weight, polymer in 60 to 70%, by weight, excess isocyanate.

The polyol hardener system consists at least of an amine-based polyol, a polyether polyol or blends of these polyols. The amine-based polyols have been identified hereinabove with the N,N,N',N'-tetrakis(2-hydroxypropyl)ethylenediamine being preferred.

Suitable polyether polyols include aliphatic alkylene glycol polymers having an alkylene unit composed of at least two carbon atoms. These aliphatic alkylene glycol polymers are exemplified by polyoxypropylene glycol and polytetramethylene ether gylcol. Di-, tri- and tetrafunctional compounds are available with the trifunctional ones being exemplified by the reaction product of glycerol or trimethylol propane and propylene oxide. A typical polyether polyol is available from Union Carbide under the designation PPG-425. The trifunctional compounds are preferred. Suitable polyether polyols will generally have molecular weights of from 60–7000 with the diols ranging from 60–200, the triols from 400–7000 and the tetrols from 400–600. The preferred polyol is a blend of amine-based polyol and polyether polyol being present in weight ratios ranging from 1:1 to 1:9 and preferably 1:2 to 1:4.

As previously noted, the polyurethane systems of this invention are prepared by admixing the prepolymer with the polyol hardener. Catalysts and optional additives are included with the hardener system. Generally stoichiometric amounts of prepolymer and polyol are utilized, with the possibility of deviating from the stoichiometric amount by utilizing up to about 25% excess prepolymer or up to about 2% excess polyol. Solid, thermoset polyurethane elastomers are obtained within about 40 minutes at room temperature.

Catalysts are known to those skilled in the art and may comprise, for example, heavy metals utilized in amounts of about 0.1% metal, by weight of hardener, e.g. organo tin, organo zinc, mercury and lead compounds. Tertiary amines may also be utilized.

Optional additives include anti-foaming agents such as glycerine, an ethyl acrylate-2-ethylhexyl acrylate copolymer, dimethyl siloxane copolymers and silicones; antioxidants such as esters of $\beta$-(3,5-di-tert.butyl-4-hydroxyphenyl)-propionic acid with monohydric or polyhydric alcohols, for example, methanol, octadecanol, 1,6-hexanediol, neopentylglycol, thiodiethyleneglycol, diethyleneglycol, triethyleneglycol, pentaerythritol, tris-hydroxyethyl isocyanurate, and di-hydroxyethyl oxalic acid diamide; UV absorbers and light stabilizers such as 2-(2'-hydroxyphenyl)benzotriazoles and sterically hindered amines as bis-(2,2,6,6-tetramethylpiperidyl)-sebacate, bis-(1,2,2,6,6-pentamethylpiperidyl)-sebacate, n-butyl-3,5-di-tert.butyl-4-hydroxybenzyl malonic acid bis-(1,2,2,6,6-pentamethylpiperidyl)ester, condensation product of 1-hydroxyethyl-2,2,6,6-tetramethyl-4-hydroxypiperidine and succinic acid, condensation product of N,N'-(2,2,6,6-tetramethylpiperidyl)-hexamethylendiamine and 4-tert.octylamino-2,6-dichloro-1,3,5-s-triazine, tris-(2,2,6,6-tetramethylpiperidyl)-nitrilotriacetate, tetrakis-(2,2,6,6-tetramethyl-4-piperidyl)-1,2,3,4-butane-tetracarbonic acid and 1,1'(1,2-ethanediyl)-bis-(3,3,5,5-tetramethylpiperazinone); plasticizers such as phthalates, adipates, glutarates, epoxidized vegetable oils, and the like; fungicides; pigments; dyes; reactive dyes; moisture scavengers; and the like.

As previously noted, the polyurethanes possess the desired properties for a wide range of utilites, with primary emphasis on molding and prototype fabrication. Thus, the resulting systems are water clear, heat resistant, hard and impact resistant. They exhibit sufficiently low mixed viscosities to facilitate mixing, pouring and air bubble diffusion, thereby allowing for the formation of bubble free castings of both simple and intricate shapes. The resulting molded products exhibit low shrinkage during molding and subsequent thereto. Systems containing light stabilizers exhibit prolonged stability without encountering significant color formation and/or degradation.

The following examples illustrate the preferred embodiments of the invention. In these examples, all parts given are by weight unless otherwise specified.

EXAMPLE 1

This example illustrates the preparation of a typical polyurethane system of this invention.

| Prepolymer (A) | parts |
|---|---|
| 4,4'-methylene bis(cyclohexylisocyanate) | 3720 |
| N,N,N'N'—tetrakis(2-hydroxypropyl)ethylenediamine | 280 |

The components were charged to a flask equipped with nitrogen inlet, mechanical stirrer and thermometer, which was attached to a vacuum pump. The contents were heated to 80° C. with mixing under vacuum, then reacted for 1 hour at 80° C. under nitrogen. The product was characterized by an NCO content of 24.7%, by weight.

| Hardener (H) | parts |
|---|---|
| N,N,N',N'—tetrakis(2-hydroxypropyl)ethylenediamine | 300 |
| polyether triol (MW = 615)[1] | 200 |
| polyether triol (MW = 4500)[2] | 496 |
| ethyl acrylate/2-ethylhexyl acrylate copolymer | 0.5 |
| bis(1,2,2,6,6-pentamethyl-4-piperidinyl)-sebacate | 12.5 |
| 2(2'-hydroxy-3',5'-di-tert.amylphenyl)-benzotriazole | 12.5 |
| dibutyl tin dilaurate | 0.9 |

[1]POLY G 30-208 from Olin Corp.
[2]POLY G 85-36 from Olin Corp.

The ingredients were charged to a flask, heated to 100° C. under vacuum and the temperature maintained until a moisture level of 0.04% was reached. The mixture was cooled to 70° C. and the catalyst then admixed therewith.

| Polyurethane #1 | parts |
|---|---|
| Prepolymer A | 100 |
| Hardener H | 100 |

A mix of the two was prepared with the excellent properties thereof being illustrated in subsequent examples.

EXAMPLE 2

| | Prepolymer | | |
|---|---|---|---|
| | B | C | D |
| | | (parts) | |
| 4,4'-methylene-bis(cyclohexylisocyanate) | 910 | — | 704 |
| isophorone diisocyanate | — | 90 | — |
| polymer of ethylenediamine/propylene oxide/ethylene oxide | 90 | 10 | — |
| N,N,N',N'—tetrakis(2-hydroxypropyl)-ethylenediamine | — | — | 96 |
| reaction temperature (°C.) | 70–83 | 80–84 | 80 |
| reaction time (minutes) | 30 | 10 | 60 |
| NCO content (%) | 25.9 | 35.05 | 22.5 |

These prepolymers were prepared according to the procedure of Example 1.

EXAMPLE 3

|  | Hardener | | | | | | |
|---|---|---|---|---|---|---|---|
|  | I | J | K | L (parts) | M | N | O |
| N,N,N',N'—tetrakis(2-hydroxypropyl) ethylenediamine | 900 | — | 90 | — | — | 600 | 50 |
| polyether triol (MW = 615)[1] | 600 | 85 | 59.4 | 56 | 88.8 | 400 | 50 |
| polyether triol (MW = 4430)[3] | — | — | 60 | — | — | — | — |
| polyether triol (MW = 4500)[2] | 1498 | — | 90.6 | — | — | 983 | — |
| di(C$_{7,8,11}$-alkyl)phthalate | — | 14.6 | — | — | — | — | — |
| phenyl mercuric propionate | — | 0.4 | — | — | 0.2 | — | — |
| dibutyl tin dilaurate | 1.5 | — | 0.15 | 0.1 | — | 1.8 | — |
| dipropylene glycol | — | — | — | 19 | 11 | — | — |
| triethylenediamine | — | — | — | — | — | — | 0.5 |
| bis(1,2,2,6,6-pentamethyl-4-piperdinyl)sebacate | — | — | — | — | — | 5 | — |
| 2(2'-hydroxy-3',5'-di-tert.amylphenyl) benzotriazole | — | — | — | — | — | 5 | — |
| tetrakis(methylene(3,5-di-tert.butyl-4-hydroxyhydro-cinnamate)methane | — | — | — | — | — | 5 | — |
| reaction temperature (°C.) | 100 | RT | 100 | RT | RT | 100 | 100 |

[3]TPE 4542 from BASF

These hardeners were prepared by the general procedure of Example 1.

EXAMPLE 4

The following polyurethane systems of this invention were made by the general procedure of Example 1.

|  | 1 | 2 | 3 | 4 | 5 | 6 | 7 | 8 | 9 |
|---|---|---|---|---|---|---|---|---|---|
| Prepolymer | A | B | C | A | D | A | A | A | A |
| Hardener | H | J | H | M | M | L | I | K | N |
| Weight ratio (P/H) | 100/100 | 80/100 | 80/100 | 100/90 | 100/80 | 100/75 | 100/100 | 100/100 | 100/100 |

The resulting systems were then subjected to the following test procedures to identify physical and performance characteristics.

Viscosity—determined on a Brookfield RVF viscometer using spindle #3 at 20 rpm. Samples were mixed for two minutes and the viscosity reading taken three minutes after start of mixing. All samples were at room temperature (23°–25° C.).

Hardness—Shore D Hardness measured by ASTM standard test method D 2240-81.

Heat Deflection Temperature (HDT)—determined according to ASTM D 648-82 using a load of 264 psi on a sample size 1.27 cm × 1.27 cm × 12.7 cm.

Impact Strength—Izod impact determined utilizing ASTM D 256-1, Method A, on a 1.27 cm × 1.27 cm specimen.

The results of these determinations are noted in the following table:

|  | Polyurethane (#) | | | | | | | | |
|---|---|---|---|---|---|---|---|---|---|
|  | 1 | 2 | 3 | 4 | 5 | 6 | 7 | 8 | 9 |
| viscosity (cps.) | 1125 | 300 | — | 400 | 2720 | — | 1655 | 1475 | 1395 |
| Shore D hardness | 77 | 50 | 55 | 76 | 79 | — | 72 | 73 | 77 |
| HDT (°C.) (RT cure) | 54 | — | — | 39 | 37 | 34 | 44 | 48 | 54 |
| (16 hr cure @ 80° C.) | 68 | — | — | — | 49 | — | — | — | 68 |
| Izod impact | 1.3 | — | — | 0.72 | — | — | 1.2 | 1.09 | 1.3 |

The excellent properties of these systems are thus evident.

EXAMPLE 5

This example illustrates the casting capability of the polyurethane systems of this invention.

A silicone mold for a perfume bottle prototype was utilized. 50 parts prepolymer A and 50 parts hardener H were weighed into a metal can. The can contents were mixed by hand for 2 minutes and then placed in a vacuum desicator. The sample was held under a 30 mm Hg vacuum for 5 minutes at which time nearly all the entrapped air had been removed. The de-aired mixture was carefully poured into the mold to avoid entrapping air bubbles. The mold was allowed to stand at room temperature (23°–25° C.) for 16–24 hours. The completed bottle was removed from the mold. The entire procedure was done at room temperature (23°–25° C.). Several clear, shrink-free, bubble-free, castings were obtained using this method.

In summary, this invention provides novel clear, castable polyurethane systems. Variations may be made in procedures, proportions and materials without departing from the scope of the invention as defined by the following claims.

What is claimed is:

1. A substantially clear, castable polyurethane system comprising the reaction product of (a) a polyisocyanate prepolymer comprising the reaction product of an excess of an aliphatic or cycloaliphatic polyisocyanate compound and an amine-based polyol, and (b) an amine-based polyol, a polyether polyol or mixtures thereof.

2. The system of claim 1, wherein said polyisocyanate in said prepolymer is 4,4'-methylene bis(cyclohexylisocyanate), hexamethylene diisocyanate or isophorone diisocyanate.

3. The system of claim 1, wherein said amine-based polyol is N,N-bis(2-hydroxypropyl)aniline, N,N,N',N'-tetrakis(2-hydroxypropyl)ethylenediamine or a polymer of ethylene diamine-propylene oxide-ethylene oxide.

4. The system of claim 1, wherein the prepolymer contains 85–95% polyisocyanate and 5–15% amine-based polyol to form a prepolymer system of 20–55% polymer dissolved in 45–80% polyisocyanate, all percentages being on a weight basis.

5. The system of claim 1, wherein said polyether polyols have a molecular weight of from 60–7000.

6. The system of claim 5, wherein said polyether polyol is an aliphatic alkylene glycol polymer having an alkylene unit composed of at least two carbon atoms or a di-, tri- or tetra-functional polyol compound.

7. The system of claim 6, wherein said polyether polyol is a trifunctional polyol compound.

8. The system of claim 1, wherein said component (b) is a blend of an amine-based polyol and at least one polyether polyol, said amine-based polyol and said polyether polyol being present in a weight ratio of from 1:1 to 1:9.

9. The system of claim 8, wherein said polyether polyol is a trifunctional polyol compound.

10. The system of claim 1, wherein components (a) and (b) are present in stoichiometric amounts up to a 25% excess of component (a) or a 2% excess of component (b).

11. The system of claim 1 which also contains one or more light stabilizers and antioxidants.

12. The system of claim 1, wherein said prepolymer (a) is the reaction product of 4,4'-methylene bis(cyclohexylisocyanate) and N,N,N',N'-tetrakis(2-hydroxypropyl) ethylenediamine, and said polyol (b) is a blend of N,N,N'N'-tetrakis(2-hydroxypropyl)ethylenediamine, a polyether triol having a molecular weight of 615 and a polyether triol having a molecular weight of 4500.

13. The system of claim 10, wherein said prepolymer (a) and said polyol (b) are present in equal amounts by weight.

14. A shaped article comprising the polyurethane system of claim 1 subsequent to the curing thereof.

* * * * *